Patented Mar. 9, 1954

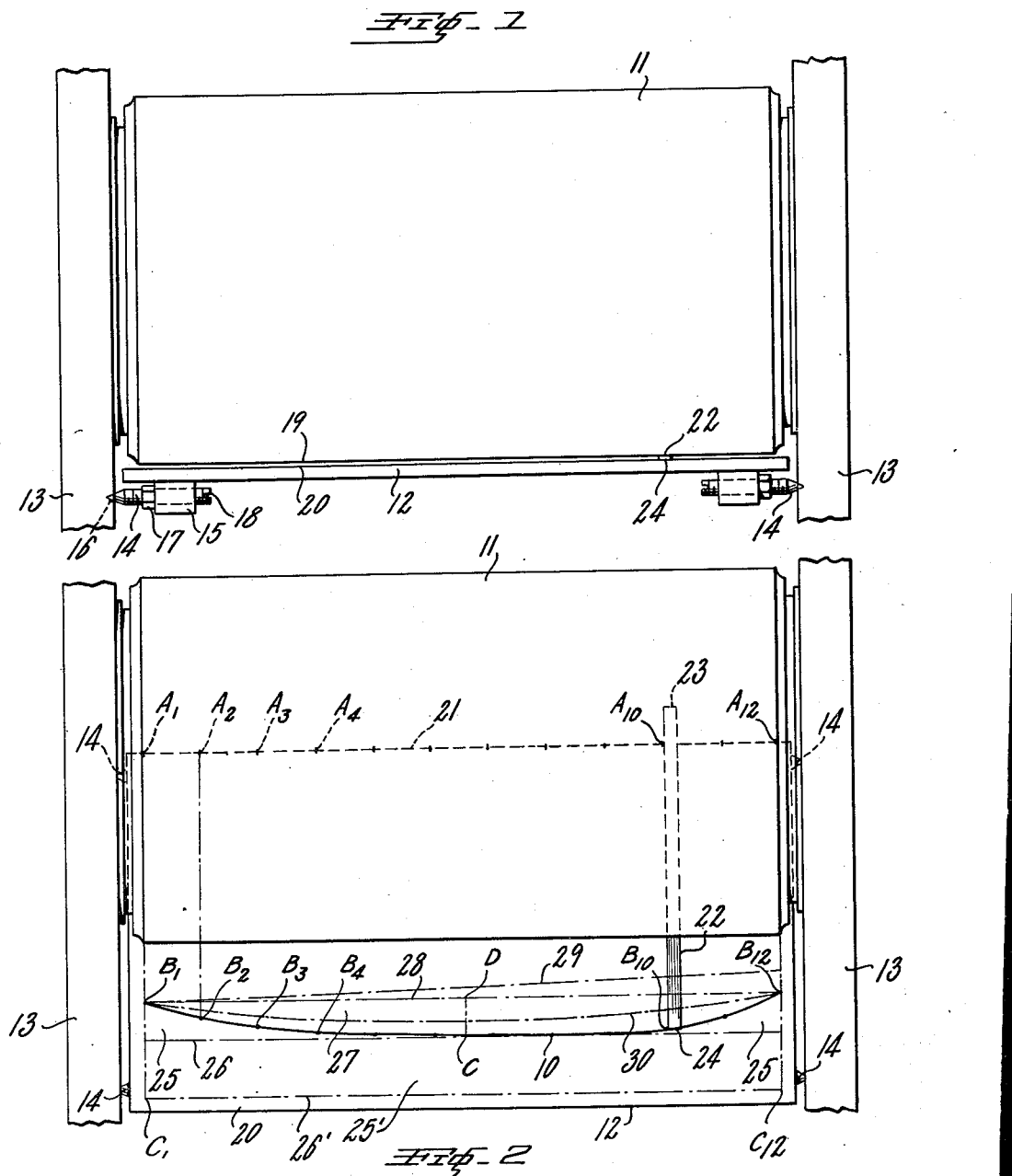

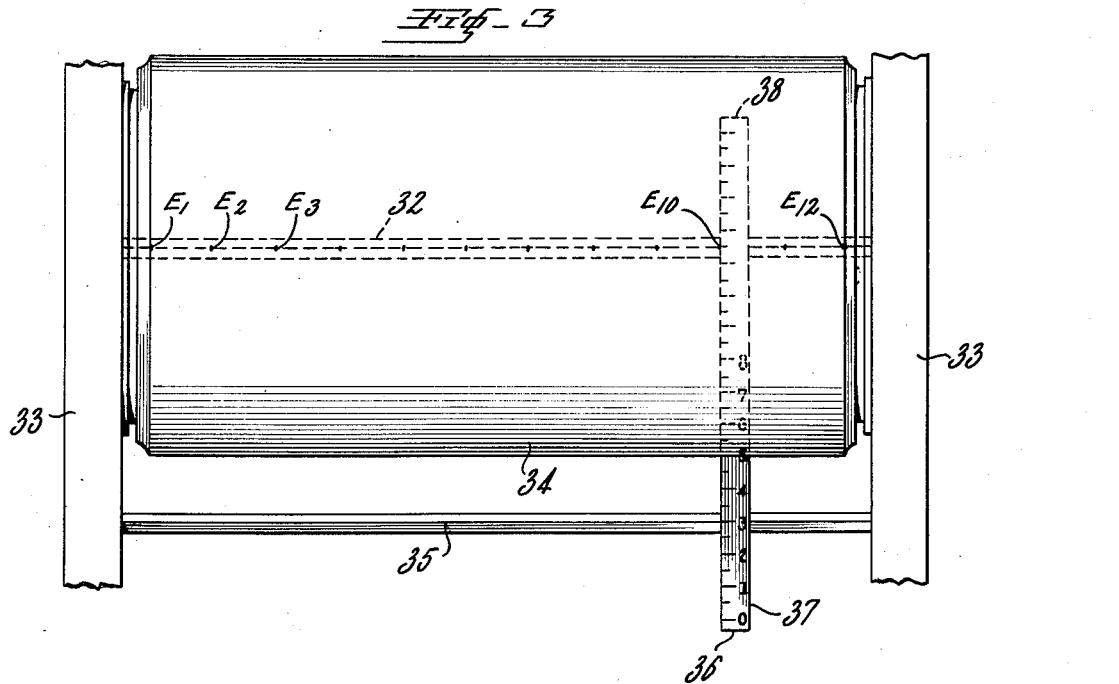
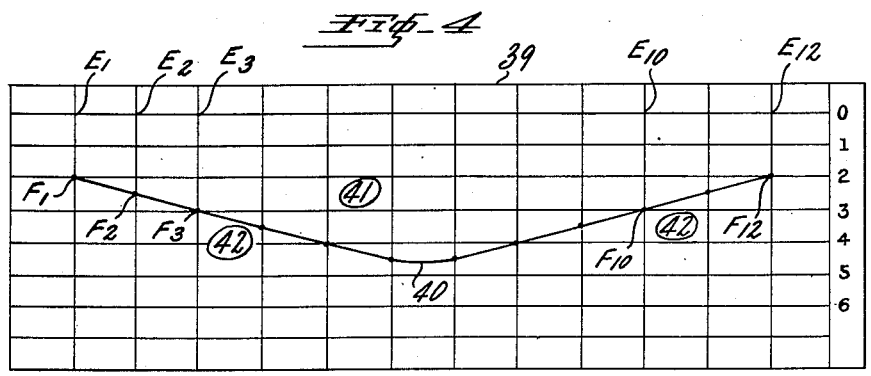
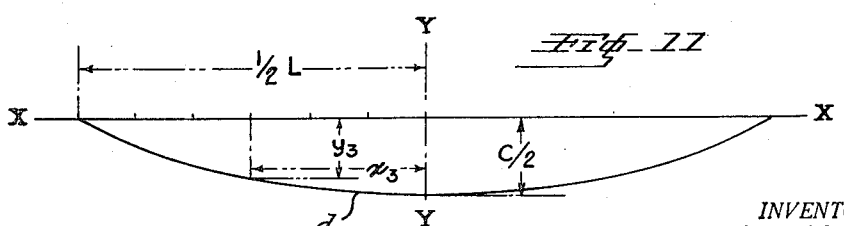

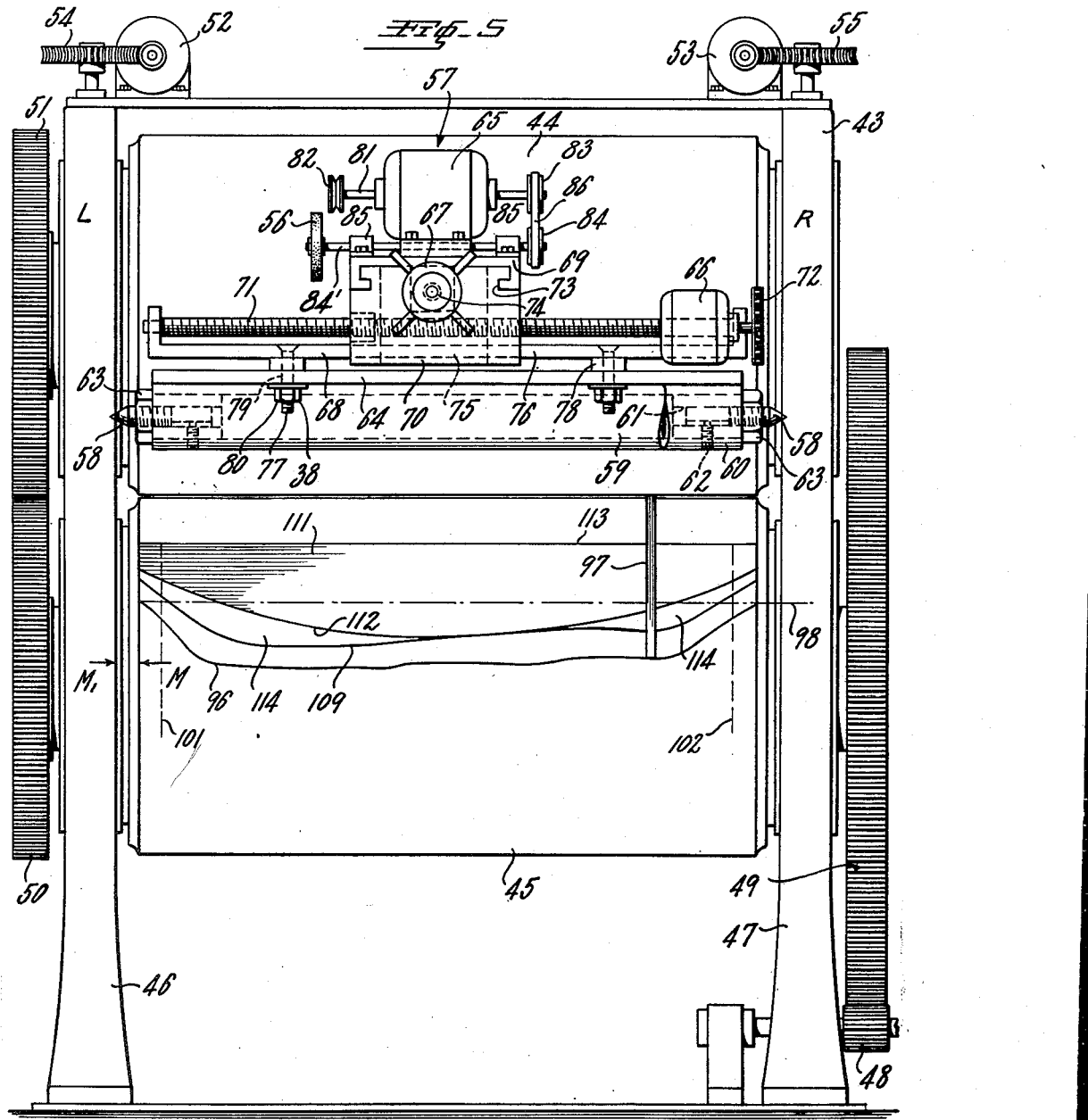

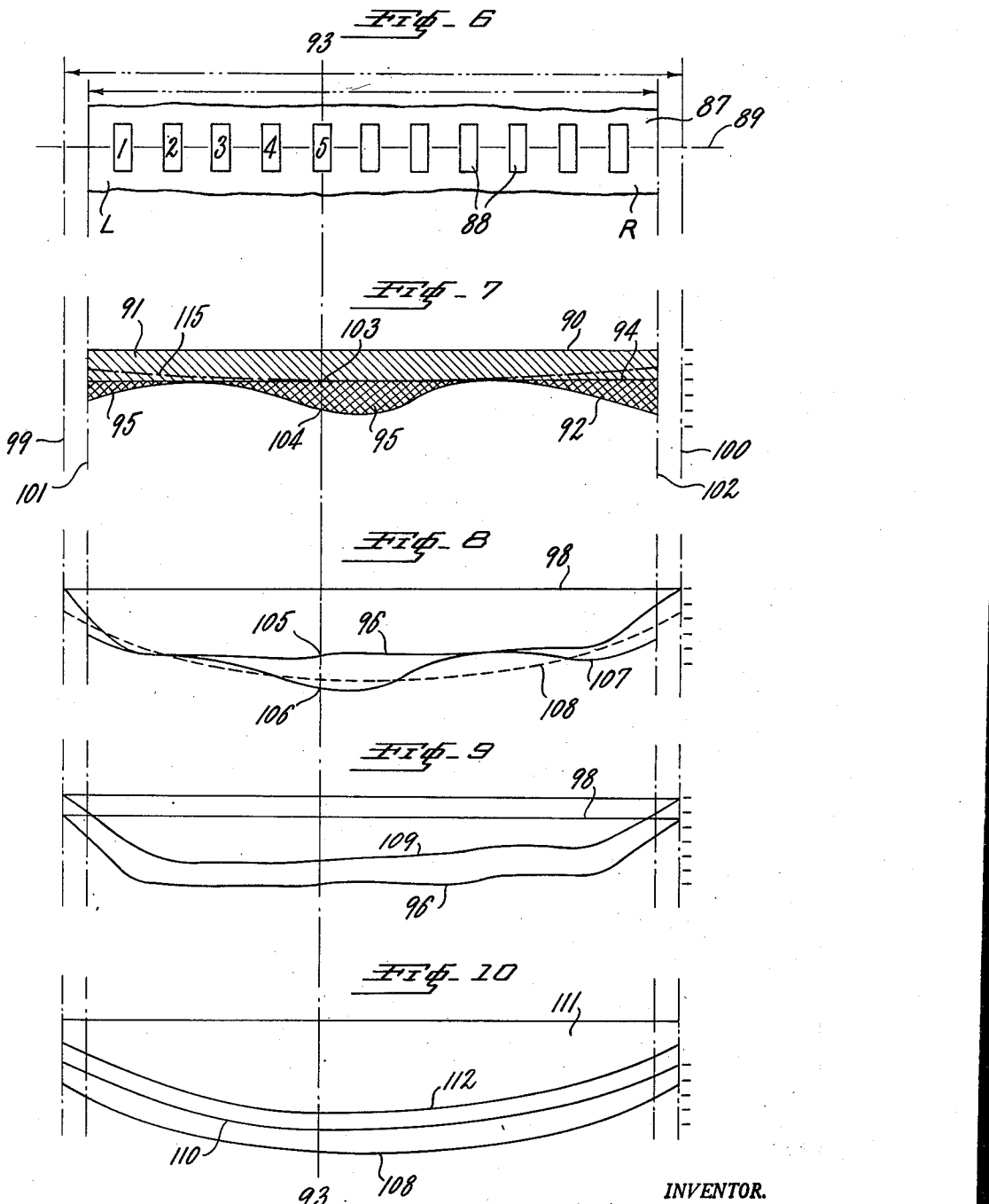

2,671,296

UNITED STATES PATENT OFFICE 2,671,296

METHOD OF MAKING GRAPHS AND GRINDING ROLLS BY AID OF GRAPHS

Paul W. Geyer, Detroit, Mich., assignor to United States Rubber Company, New York, N. Y., a corporation of New Jersey Application August 11, 1949, Serial No. 109,700

7 Claims. (Cl. 51—289)

This invention relates to an improved method of making a magnified graph of the variations of the shortest distances between two surfaces at points along a line towards which the surfaces approach each other at points of closest proximity, which line is hereinafter referred to as the line of closest proximity of the surfaces. The graph comprises a line, hereinafter referred to as a profile line of the space between the surfaces, which is plotted in reference to the line of closest proximity, or a line parallel thereto. The difference in the length of any two perpendiculars from the line of closest proximity to the profile line is the magnified variation of the shortest distances between the surfaces at the points corresponding to the intersection of the perpendiculars with the line of closest proximity. In most cases, to which this method is applicable, the line of closest proximity is considered to be a straight line, and the surfaces converge towards such line from each side thereof. From such graph the minimum profile of the space between the surfaces may be obtained, assuming the surfaces were in contact at one or more points.

The invention also relates to the use of such graph to shape or grind one or both of the surfaces to produce the desired profile of the space between the surfaces along the line of closest proximity. The space between such surfaces is represented by an area generated by a line which coincides with the lines of the shortest distances between the opposite surfaces, as such generating line is moved along said line of closest proximity.

This invention is particularly useful in its application to grinding calender rolls to a contour which will form the desired profile of the space therebetween that will be capable of producing a calendered sheet of plastic of a desired transverse cross-section, and in such application the invention includes the various procedures or steps for determining and producing the desired profile of the space. In the practice of the method the amount of metal to be removed from a roll and its location is accurately plotted on a surface in the form of a graph with the aid of a tapered gauge. Such graph with the aid of the gauge is used to ascertain when the required amount of metal has been removed to produce the desired profile of the space.

Heretofore, the distances between two calender rolls at sufficient points along their axis were directly measured with feeler gauges to determine where and how much material was required to be removed to obtain the required profile of the space between the rolls. The same procedure was used to determine the profile of the space after the rolls were ground to the estimated desired contour. In such prior practice accurate graphs showing the amount of metal to be removed could not be obtained. Also, such prior method was slow and inaccurate as compared to the improved method of this invention, which improved method will be described herein in reference to the accompanying drawing, in which:

Fig. 1 is a front elevational view of the bottom roll of a calender, illustrating the method of making a magnified graph of the variations of the shortest distances between the bottom surface of the roll and a flat plate affixed to the calender frame beneath the roll;

Fig. 2 is a top plan view of the calender roll and the plate shown in Fig. 1;

Figs. 3 and 4 illustrate a modification of the method shown in Figs. 1 and 2;

Fig. 5 is a front elevational view of a two-roll calender, showing a grinding apparatus attached thereto, and illustrating the method of determining a magnified graph of the variations of the shortest distances between the calender rolls, and the method of grinding one of the rolls to obtain the proper calendering profile, that is, the profile of the space between the rolls when they are calendering a sheet;

Figs. 6 to 10 illustrate the several steps used in the method of determining the proper profile of the space between calender rolls required to produce a calendered sheet of the desired transverse cross-section; and Fig. 11 illustrates the manner of computing the deflection correction curve used in Fig. 8.

The practice of the method of making a magnified graph of the shortest distances between two surfaces in accordance with this invention is illustrated in Figs. 1 and 2 of the drawings. As shown herein, the graph comprising a profile line 10 is made of the shortest distances between the bottom roll 11 of a calender and a flat plate 12, which is suspended below the roll 11 between the side frames 13, in which the roll 11 is journaled. The plate 12 is suspended between the side frames 13 by means of clamping screws 14, which extend through lugs 15 on the plate 12, and into sockets 16 in the side frames 13. The pointed ends of the screws 14 are retained in the sockets 16 by nuts 17, which are turned on the threads of the screws 14 towards the end containing the screw driver slot 18, until the nuts 17 are backed up against the lugs 15, while the pointed ends of the screws 14 are forced into the sockets 16. As shown in Fig. 2, a pair of such clamping screws 14 are secured to each end of the plate 12 to retain it in place.

As shown in Fig. 2, the line of closest proximity between the bottom surface 19 of the roll 11 and the top surface 20 of the plate 12 is represented by the back edge 21 of the plate. The variations of the shortest distance between the plate 12 and the bottom surface 19 of the roll 11 is represented by the variations in the distances between the line 21 and the profile line 10, and it is the relationship of this line and the line of closest proximity 21, or a line parallel thereto that is referred to as the graph. The profile line 10 is made with the aid of a tapered gauge 22. The gauge 22 is provided with a very small percentage of taper. Preferably the taper of the gauge is 1 inch to 1,000 inches of length. Such taper is referred to in terms of percentage of taper, that is, the variations in thickness per unit length. In the preferred example, the percentage of taper is .001. The profile graph line 10 is plotted on the surface of the plate 12 by extending the thin end 23 of the gauge between the back edge 21 of the plate and the bottom surface of the roll 11 at points such as indicated by the points $A_1$, $A_2$, $A_3$, etc., along the line 21. The gauge 22 is wedged between the surfaces at each of the points with a uniform pressure, and while the gauge is projected at substantially right angles to the line 21, the relative position of some point on the gauge 22 is marked on the top surface of the plate 12 with respect to the line 21. In the example shown in Fig. 2, the thick end 24 of the gauge 22 is selected as the point. The relative positions of the thick end 24 of the gauge 22 when it is at each of the positions $A_1$, $A_2$, $A_3$, etc., on the line 21 is marked, or indicated by the points $B_1$, $B_2$, $B_3$, etc., which define the profile line 10 comprising a smooth line drawn between such points. The differences in the perpendicular distances $A_1$, $B_1$ and $A_2$, $B_2$ is equal to the actual difference in the distances between the surfaces at the points $A_1$ and $A_2$ divided by the percentage of the slope of the tapered gauge 22 which was used to plot the graph line 10. In the example given, where the taper of the gauge 22 is one inch for each one thousand inches in length, the variations of the shortest distances between the surfaces are magnified one thousand times.

The profile line 10 thus obtained indicates that the roll 11 is crowned between its ends, because the central portion of the graph line 10 is more distant from the line of closest proximity 21 than the end points of the line 10. If the edge 21 of the plate 12 were moved into contact with the roll 11 without changing its angular relation with the axis of the roll at the time the profile line 10 was made, the area 25 included between the profile line 10, and the extension of the perpendiculars $A_1$, $B_1$ and $A_{12}$, $B_{12}$, and a line 26 parallel to line 21 drawn through any point C on the graph line 10 which is most remote from the line 21 would represent the actual profile of the space between the back edge 21 of the plate 12 and the roll 11, except such profile is magnified in the direction of the gauge 22.

A line parallel to the line 21 may be established by measuring the actual distance between the roll 11 and the plate 12 along the edge 21 at at least two points (e. g., $A_1$ and $A_{12}$) with a feeler or thickness gauge, and plotting such distance divided by the percentage of slope of the gauge 22 downwardly from corresponding points (e. g., $B_1$ and $B_{12}$) on the profile line 10, and then drawing a line 26' through the points $C_1$ and $C_{12}$ thus established. The area 25' between the line 26' and the profile line 10 would be the actual magnified profile of the space between the roll 11 and the edge 21 of the plate.

The area 27 included between the profile line 10 and a line 28 drawn through the end points $B_1$ and $B_{12}$ of the profile line 10 indicates how much crown there is on the roll 11, and the least amount of metal required to be removed from the roll to remove all of the crown. The maximum crown is indicated by the greatest distance on a perpendicular from the line 28 to a point on the graph line 10 most remote from the line 28, such as indicated by the line CD. If it is desired to remove the crown indicated by the area 27 between the lines 10 and 28, the roll 11 may be ground by known methods, as will be described with reference to Fig. 5, until the thick end 24 of the gauge 22 will be positioned on the line 28 when the thin end 23 is wedged between the plate 12 and the roll 11 at any point along the line 21 of closest proximity between the surfaces. Assuming the line 28 is parallel to the line 21, and the line 21 is a straight line and parallel to the axis of the roll 11, the surface of the roll will be a perfect cylinder when the crown is removed. If it is desired to produce a conical surface, a line 29 may be drawn at an angle to the axis of the cylinder as represented by the line 21, at the desired angle thereto, and through a point on the profile line 10, but intersecting it. Of course, no part of line 29 should extend into the profile of the space 25. The roll is then ground so that the thick end of the gauge 22 falls on the line 29.

It is also evident, that the crown of the roll 11 may be changed to the desired crown by drawing a crown line 30 on the surface of the plate 12 so that it does not extend within the profile space 25, and then grinding the roll so that the thick end 24 of the gauge 22 falls on that line.

If desired the graph of the variable distances between the surfaces may be plotted on other surfaces than the surface of the plate 12. For example, the tapered gauge 22 may be made of flexible steel, and it may be bent upwardly around the roll 11 when it is wedged between the plate and the roll at the various points along the line 21, and the position of the thick end 24 of the gauge may be marked on the surface of the roll 11 to form a profile line of the shortest distances between the surfaces corresponding to the line 10.

The profile line may also be plotted on a non-associated surface, by providing the gauge 22 with uniform graduations extending longitudinal thereof from the thick end of the gauge. Such method of plotting the profile line is illustrated in Figs. 3 and 4, whereby the use of a plate may be eliminated if found to be more convenient. A straight edge 32 may be arranged between the frame 33 in reference to the surface of the cylinder 34 corresponding to the arrangement of the back edge 21 of the plate 12 in Fig. 2. A straight edge 35 may be affixed between the calender frame 33 parallel to the straight edge 32 and in position so that the thick end 36 of the tapered gauge 37 will cross over it, when the thin end 38 is projected between the straight edge 32 and the surface of the roll 34. The thick end 36 of the gauge 37 is evenly graduated longitudinally therefrom, so that the graduation with respect to the straight edge 35 indicates the variable distances the thin end 38 of the gauge extends beyond the straight edge 32 when it is projected between the straight edge 32 and the roll 34, at any point along the straight edge, for example, $E_1$, $E_2$, $E_3$, etc. The variations of the distances of the thick end 36 of the gauge 37, or zero point thereon, from the straight edge 32, when the gauge 37 is wedged between the straight edge 32 and the roll 34 at the points $E_1$, $E_2$, $E_3$, etc. are plotted on a separated graph paper 39. The distances are plotted downwardly from a horizontal zero line and are measured on the vertical lines $E_1$, $E_2$, $E_3$, etc., spaced from each other corresponding to the points $E_1$, $E_2$, $E_3$, etc., on the straight edge 32. The horizontal lines 0, 1, 2, 3, etc., are equally spaced corresponding to the graduations 0, 1, 2, 3, etc., of the scale on the gauge 37. The profile line 40 indicating the magnified variation of the distances between the edge 32 and the roll 34 is plotted by reading the tapered gauge scale opposite the edge 35 while it is wedged at the points $E_1$, $E_2$, $E_3$, etc., and plotting the scale reading on the horizontal line of the graph corresponding to the scale reading and on the vertical line corresponding to the position $E_1$, $E_2$, $E_3$, etc., of the scale on the edge 32 to form the points $F_1$, $F_2$, $F_3$, etc., which define the profile line 40. The area 41 included between the line 2 and the profile line 40 is the crowned area of the roll 34 magnified vertically, the magnification being the actual divided by the precentage of taper of the gauge 37. Assuming that the straight edge 32 maintained the same angular relation to the axis of the roll 34 and was tangent to the crown line of the roll, then the area 42 included between the profile line 40, the vertical lines passing through the ends of the profile line, and a line passing through the lowest point on the profile line and parallel to the horizontal scale lines is the magnified profile of the space between the edge 32 and the roll 34.

The foregoing describes the basic principles of this invention. Now the application of this invention will be described in reference to grinding calender rolls to a selected contour, which will produce a selected profile of the space between the rolls, which is capable of calendering a sheet of plastic of the desired transverse cross-section. Referring to Fig. 5, the calender rolls 44 and 45 are supported in side frames 46 and 47. The rolls are driven by a driven pinion 48 which meshes with a gear 49 on the shaft of the lower roll 45. A gear 50 is keyed to the shaft of the roll 45, and it meshes with a gear 51 on the shaft of the upper roll 44. The bottom roll 45 is held in stationary bearings in the side frames 46 and 47. The upper roll 44 may be moved vertically by the motors 52 and 53 through the worm and gear drives 54 and 55 in the usual manner, so as to adjust the space between the rolls by moving either end of the upper roll 44 in respect to the lower roll 45.

As the rolls 44 and 45 are rotated, one of the rolls is ground by an abrasive wheel 56 of a grinding machine 57 for producing the desired profile line of the space between the rolls. As shown in Fig. 5, the machine 57 is affixed to the side frames 46 and 47 in position to grind the upper roll 44, but if desired it may be moved downwardly into position to grind the lower roll. Two extensible clamping screws 58 are provided at each end of the grinding machine frame. A clamping screw 58 is mounted in each end of the front tubular cross frame member 59 and the like rear member 60, which is shown behind the broken off end of the front member 59. The clamping screws 58 are slidably mounted in bores 61 in the two frame cross members 59 and 60, and they are held against rotation in the bores by set screws 62, which extend into longitudinal grooves in the clamping screws 58. A nut 63 is threaded onto each of the clamping screws 58, and it abuts against the end of the cross member. The nuts 63 are adapted to project the screws 58 from the ends of the cross members 59 and 60, and extend their pointed ends into recesses in the side frames 46 and 47 of the calender.

The grinding wheel 56 is adjustably mounted on a bed plate 64, which is affixed to the cross members 59 and 60 of the grinding machine frame. The grinding wheel 56 is rotatably driven by a motor 65, and it is movable axially of the calender rolls 44 and 45 by a motor 66. A cross feed hand wheel 67 is provided for moving the grinding wheel 56 towards or away from the surface of the calender rolls. Such mechanisms for rotating and manipulating the grinding wheel 56 are mounted on a track plate 68 which is supported by and adjustable on the bed plate 64, so that the movement of the grinding wheel 56 along the axis of the calender roll by the motor 66 may be parallel to such axis or at an angle thereto as may be desired.

The grinding wheel 56 and the motor 65 for rotating it are mounted on a cross feed carriage 69 carried by a traversing carriage 70 which is movable axially of the calender rolls 44 and 45 by a feed screw 71, which is operated by the traversing motor 66 through a chain and gear drive 72, the motor and drive being supported on the track plate 68. The cross feed carriage is slidable in guides 73 on the traversing carriage 70, and it is operated by the hand wheel 67 through a cross feed screw 74 to which the hand wheel is affixed. The traversing carriage 70 is provided with guides 75, which are slidable along the track plate edges 76 of the track guide plate 68.

The track plate 68 is adjustably mounted in respect to the axis of the calender rolls on the bed plate 64 by bolts 77 which are affixed to the track plate 68 and extend through separating sleeves 78 between the track plate and the bed plate 64. The threaded ends of the bolts 77 extend through slots 79 formed in and transversely to the bed plate 64. The movement of the bolts 77 in the slots 79 permits the adjustment of the traversing screw 71 at the desired angle to the axis of the calender roll 44. After the track plate 68 has been properly adjusted, it is secured in place by tightening the nuts 80 of the bolts 77 against the bed plate 64.

The position of the grinding wheel is adapted to be changed to either side of the carriage 69 so that it may be traversed to either end of the calender rolls. For that purpose the ends of the motor shaft 81 are provided with pulleys 82 and 83, one of which is adapted to drive the pulley 84 on the shaft 84' of the grinding wheel 56, when the grinding wheel is positioned on either side of the carriage 69. The shaft 84" is supported in bearings having removable caps 85, so that the ends of the shaft may be reversed and the grinding wheel 56 may be changed to the opposite side of the carriage 69, and may be driven from the motor pulley 82 through the belt 86 when it is also shifted to the opposite side of the carriage 69 and placed on the pulley 84 on the grinding wheel shaft 84'.

The grinding machine 57 may be attached to the calender 43 by means of the clamping screws 58 and nuts 63 for grinding either the bottom roll 45 or the top roll 44. As shown in Fig. 5 the grinding machine 57 is attached in position to grind the top roll 44. The recesses for the points of the clamping screws 58 in the side frames 46 and 47 are located so that the traversing screw 71 is about parallel with the axis of the roll 44. The fine adjustment of the screw 71 in respect to the axis of the roll may be obtained by moving the track plate 68 on the bed plate 64, and clamping the former in place by means of the clamping screws 77 and nuts 80. Having so assembled the grinding machine, the roll 44 may be ground to the desired contour by rotating the calender roll 44, and grinding its rotating periphery with the abrasive wheel 56, which is driven from the motor 65. The depth of the cut made by the abrasive wheel 56 is controlled by the cross feed hand wheel 67 which is adapted to move the wheel 56 towards and away from the axis of the roll, while the wheel is traversed axially of the roll by the motor 66, which drives the traversing screw 71.

Having described the grinding wheel, and its operation for changing the shape of the calender rolls, the problems involved in grinding calender rolls to form the desired profile of the space therebetween required to produce a calendered sheet of a predetermined cross section, and the failure of the prior methods to successfully solve such problems will now be discussed.

Metal calender rolls when operating upon plastics are normally heated to a temperature which cause them to expand and change their contour due to uneven expansion. The rolls under operating calendering conditions are also deflected due to the calendering pressure therebetween. When the rolls are taken out of operation and cooled, the profile of the space between the rolls changes due to their uneven contraction and to the return to normal from their deflected condition. Therefore the space between the rolls under calendering conditions is different from the profile under non-calendering conditions. Since the calendering profile is the profile which determines the shape, or profile of the transverse cross section of the sheet to be calendered and it is impractical to grind a roll under that condition, the roll must be ground under the non-calendering condition. The roll is preferably ground at room temperature, because it is difficult to maintain the roll at any other constant temperature. Therefore the profile obtained under grinding conditions must be that profile which is different from, but will change under calendering conditions to a profile that will produce a calendered sheet of a predetermined cross section under calendering conditions. In the practice of the prior methods of grinding rolls, the amount and location of the metal to be removed from a roll, under the grinding conditions could not be accurately and quickly determined to produce a profile which would change to the desired operating calendering profile.

In accordance with the method of this invention, the amount and location of metal required to be removed from one or both rolls under grinding conditions to produce the desired operating calendering profile is quickly and accurately determined.

The method relating to this invention will now be described in reference to making a graph of the variations in the shortest distances between the calender rolls 44 and 45 and in reference to the use of such graph for determining and producing a profile of the space between the two calender rolls which would be required to calender a sheet of plastic of a predetermined transverse cross section.

In the practice of the method to obtain the foregoing result, the calender rolls are warmed up to their normal calendering temperature for the given plastic to be operated upon in accordance with the usual practice by circulating a heating medium through the hollow rolls. The space between the rolls 44 and 45 is adjusted by the top roll elevating mechanism 52, 54, or 53, 55, as may be required, to produce a calendered sheet of plastic having a transverse cross section, which will approximate as closely as possible the cross section of the sheet desired to be produced. In calendering soft tacky plastics, such as rubber compounds, it has been found convenient to calender the sheet onto a strip of Holland cloth. After the sheet has been calendered, a transverse section is cut from it, and the Holland cloth is stripped from the back thereof, so as to produce a transverse section 87 of the plastic sheet only, as shown in Fig. 6. In calendering resinous less tacky plastics, such as Bakelite, Vinylite, etc., the use of the Holland cloth may not be necessary. A profile of the transverse cross section of the calendered sheet is then made by taking elongated samples 88 of uniform size therefrom, and computing the thickness of each sample from its weight and plotting the transverse cross section of the sheet 87 taken along the transverse line 89, which passes through the center of the samples. The transverse cross section is plotted on a scale in which the thickness dimension is magnified by dividing such actual dimension by the percentage of slope of the tapered gauge to be used to obtain the profile line of the space between the calender rolls, while the width of the sheet 87 is plotted on full or actual scale.

The weights of the samples may be converted into such magnified thickness by the use of the following formula:

$$T = \frac{W \times S}{28.35 \times b \times p}$$

where:

$T$ = actual thickness of sample in inches divided by the percentage slope of the tapered gauge.
$W$ = weight of a sample in grams.
$S$ = 1296 divided by the area of each sample in square inches.
$b$ = the weight in ounces of a square yard of the calendered sheet having a thickness of one inch.
$p$ = percentage slope of the tapered gauge.

The magnified thickness dimensions of each of the respective samples are plotted as shown in Fig. 7 from a base line 90 to obtain the transverse cross section 91 included between the line 90 and the profile line 92, in which the width of the sheet is represented by the length of the line 90 plotted on full scale. The line 90 also represents one side of the sheet 87, assuming that side lies in a plane at the section line 89.

For the purpose of eliminating errors in plotting the thickness dimension of any sample 88 from its wrong point on the line 90, immediately after the test sheet 87 has been calendered or while it is known which side edge of the sheet was formed by a certain end of the calender roll, the edges are so marked. For example, the edges are marked L and R to correspond to the left and right side frames 46 and 47, which such edges were adjacent to as they were being calendered. The samples are numbered 1, 2, 3, 4, 5, etc., from left to right and their thickness dimension, T, as obtained from the formula, are plotted downwardly from points on the line 90 corresponding to the positions of the samples. For example, the magnified thickness dimension of the sample No. 5 is plotted on the vertical line 93 from the line 90 and such dimension is equal to the distance between the intersections of the line 93 with the lines 90 and 92. All such thickness dimension of the samples 88 are similarly plotted to obtain the profile line 92 of the cross section 91. It is to be understood that the cross section 91 is plotted on the assumption that one side of the sheet is flat, which may not be the actual case, but this does not alter the vertical thickness dimensions. A line 94 is drawn within the cross section 91 and so that the minimum amount of area 95 is included between the profile line 92 and the line 94 so drawn. The area 95 represents the amount of material, hereinafter referred to as excess material, required to be eliminated to produce a sheet of uniform cross section, provided the calender rolls were adjusted so that the line 94 would be parallel to the base line 90. Such adjustment may be made by elevating or depressing an end of the calender roll 44. For that reason it may be assumed that the line 94 is parallel to the base line 90. Assuming that it is desired to calender a sheet of uniform thickness, the excess material 95 indicates the required change in the calendering profile of the space between the calender rolls, provided the angularity of the axis of the top roll 44 was properly adjusted in respect to the bottom roll 45. In other words, if the amount of metal equal to the excess material 95 could be added to the calendering contour of one of the rolls, the desired profile of the space between the rolls would be formed to calender a sheet of uniform cross section. That being impractical, the adjusted profile of the space that would result, if such were done, is determined as close as possible in the practice of this method.

The adjusted profile of such space is hereinafter referred to as the adjusted hot profile, and it is determined as illustrated in Figs. 5 and 8. A profile line 96 of the space existing between the calender rolls 44 and 45, while at calendering temperature, but free from plastic stock, is drawn on the roll 45 by wedging a flexible tapered gauge 97 between the rolls at points along the bite line, the line of closest proximity of the rolls, and plotting the profile line by bending the flexible gauge 97 around the periphery of the roll 45, and marking the position of the thick end of the gauge as described in reference to Figs. 1 and 2 to form the profile line, hereinafter referred to as the hot profile line. It is to be understood that the profile line may also be plotted as described in reference to Figs. 3 and 4.

The hot profile line 96 may be plotted on, or transferred to a sheet of graph paper as shown in Fig. 8. When the hot profile line is transferred, it is preferably arranged so that a line 98 drawn so as to include the minimum area between it and the profile line 96, but without crossing it, will be parallel to the minimum excess material line 94 in Fig. 7, which may be on the same sheet of graph paper. In the graphs in Figs. 6 to 8, the outside vertical lines 99 and 100 define the ends of the calender rolls, and the inside vertical lines 101 and 102 define the portion of the length of the rolls used to calender the sheet 87, the width of which is equal to the distance between the lines 101 and 102.

The excess material 95 is added to the profile line 96 by plotting downwardly from that line the vertical distances from the line 94 to the line 92. For example, the distance between the points 103 and 104 is equal to the distance between the points 105 and 106 on the perpendicular 93 in Fig. 8, the line 93 being perpendicular to the lines 94 and 98. After a sufficient number of such vertical distances have been plotted to define a line, the smooth line 107 is drawn through the plotted points. The area included between the lines 96 and 107 is equal to the excess material 95.

The line 107 thus obtained is hereinafter referred to as the corrected hot profile line. Such profile line must be adjusted to correct for errors of measurement and plotting, and roll deflection to obtain the adjusted hot profile line 108. That is done by plotting a series of curves from the following formula:

$$y = \frac{x^2 \times 2C - C^2}{L^2} \times \frac{1}{p}$$

in which, referring to Fig. 11:

The axis Y—Y is a line drawn perpendicular to the axis of the calender roll at a point midway between the ends of the roll as indicated by the mid-point of the line 98.

The axis X—X is a line perpendicular to the axis Y—Y or parallel to the axis of the roll.

$y$ = the perpendicular distance below the axis X—X to a point on the curve, for example, $y_3$.
$x$ = the perpendicular distance from the axis Y—Y to a point on the curve, for example, $x_3$.
$L$ = length of the calender roll as indicated by the line 98 in Fig. 8.
$C$ = crown, or difference between the diameter of the roll at center than at ends that may be required to correct for deflection.
$p$ = percentage of slope of tapered gauge.

The curves obtained by the above formula will be referred to as deflection curves. The curve on each side of the Y—Y axis is symmetrical. After plotting the curve $d$ for one-half the length of the roll, the other half may be formed by revolving the first half about the Y—Y axis.

Every unit in the above formula is in inches. Each curve of the series is plotted by assuming a different crown C. For example, a series of curves for a roll of a particular length may suffice, if such were plotted for crowns varying by .001 inch beginning with .004 and ending with .010 inch.

The curve which fits closest to the corrected hot profile line 107 is the adjusted hot profile line 108 shown as a dotted line in Fig. 8.

Since the calender roll is grounded at room temperature, the adjusted profile line 108 must be corrected for contraction from calendering temperature to room temperature. That is done as shown in Figs. 5, 9 and 10.

The calender rolls 44 and 45 are allowed to cool to room temperature and the profile line 109 of the space between the rolls is plotted on the roll 45 with the tapered gauge 97 and while the hot profile line 96 is in its original plotted position, that is, in the same angular position in reference to the bite line. To obtain the proper relationship between the profile lines 96 and 109 an index mark M on the roll 45 should be maintained opposite an index mark $M_1$ on the frame 46 when each of the profile lines are plotted.

The hot and cold profile lines 96 and 109 are then transferred to graph paper as shown in Fig. 9, and in the relative positions shown in Fig. 5.

It is to be understood that such profile lines indicate the profile of the space between the calender rolls and not the lengthwise profile of either roll, unless the lengthwise profile of one roll is a straight line, then the profile line of the space between the rolls will also be the profile of the other roll, but in all cases the profiles or areas and the deviations of the profile lines will be magnified by the reciprocal of the percentage of slope of the tapered gauge.

After plotting the hot and cold profile lines in Fig. 9, the adjusted hot profile line 108 is replotted as shown in Fig. 10 and is corrected to a grinding profile line 110 by subtracting the area between the lines 96 and 109 in Fig. 9 from the line 108. In other words, the vertical distances between the lines 96 and 109 are plotted upwardly from the line 108 to form the points on the grinding profile line 110. For example, the vertical distance on line 93 between its intersections with lines 96 and 109 is equal to the vertical distance on line 93 between its intersections with lines 108 and 110. All other points on line 110 are similarly determined. A template 111 is then made having a room temperature profile line 112, conforming to the grinding profile line 110. When the template 111 is placed on the roll 45 so that its grinding profile line 112 is tangent to the cold profile line 109, and so that the base line 113 (which is parallel to a line passing the ends of its grinding line 112) is substantially parallel to the bite line of the rolls 44 and 45, then the area 114 between lines 109 and 112 at each end of the roll, as shown in Fig. 5 indicates the place and the amount of metal to be removed from the rolls to obtain a calendering profile between the rolls which will produce a calendered sheet of uniform cross section. Such metal may be removed from either roll or from both rolls where the total is distributed between the rolls. It is usually desirable to remove all of the metal from one roll. For example, as shown in Fig. 5, the top roll 44 is ground on its periphery along its length falling opposite the excess metal areas 114, until the cold profile line of the space between the rolls conforms to the profile line 112 of the template 111. Such condition is determined by plotting profile lines with the gauge 97 from time to time after a period of grinding and matching the profile line 112 of the template to the plotted line. The grinding wheel 56 is operated to remove the metal as previously described.

It will be evident that this method may be used to produce profiles between calender rolls for calendering sheets having cross sections other than of uniform thickness. For example, if it is desired to produce a calendered sheet having a predetermined crowned cross section, the profile line of such crown would be fitted to the profile line 92 of the cross section of the calendered sheet in Fig. 7 so that it would be bowed downwardly towards the line 92 as indicated by the crowned profile line 115 and arranged to form the minimum amount of area between it and the line 92. Such excess area would then be added to the hot profile line 96 as hereinbefore described. The subsequent steps would be carried out similarly.

While I have shown and described the preferred embodiment of my invention, it will be understood that changes in details thereof may be made without departing from the spirit thereof and the scope of the appended claims.

Having thus described my invention, what I claim and desire to protect by Letters Patent is:

1. The method of making a graph of the profile of the space between two calender rolls, comprising the steps of wedging a tapered gauge between the two rolls at a plurality of spaced points along their axes with substantially uniform pressure at each of said points, bending said tapered gauge around the periphery of one of said rolls and marking the position of an indicator mark on said gauge at each of said wedged positions on a surface conforming to the surface of the calender roll, and drawing a line through the marked positions of said indicator mark to form said profile line of the space between said calender rolls.

2. The method of drawing the grinding profile line of the space between two calender rolls for calendering a plastic sheet having a predetermined transverse profile, comprising the steps of calendering a sheet between said calender rolls while hot, plotting the transverse cross section of said sheet from a straight line and thereby forming a profile line of said cross-section opposite said straight line, drawing said predetermined transverse profile of said sheet within said plotted cross section so as to form a minimum area between it and said profile line of said cross section, plotting a hot profile line of the space between the calender rolls, adding said minimum area to said hot profile line to form a corrected hot profile line, fitting the nearest deflection curve for one of said rolls to said corrected hot profile line to form an adjusted hot profile line, plotting the cold profile of the space between the calender rolls after cooling to grinding temperature, subtracting the shrinkage area between said hot and cold profile lines from said adjusted profile line to form said grinding profile line.

3. The method of grinding at least one roll of a pair of calender rolls while cold to produce a desired profile of the space between said rolls while hot, comprising the steps of spacing said rolls so that the thinner end of a tapered gauge may be wedged between said rolls at points along their bite line, orienting the grinding profile line made in accordance with claim 2 so that its base line is parallel to the bite line and the grinding profile line falls between said bite line and an indicator mark on said tapered gauge when it is wedged between said rolls at all points along said bite line, and grinding at least one of said rolls until said indicator mark on said gauge falls on said oriented grinding profile line when said gauge is wedged between said rolls.

4. The method of grinding at least one roll of a pair of cold calender rolls to produce a profile between the rolls when hot which is capable of producing a calendered sheet having a predetermined cross section, comprising the steps of calendering a sheet of plastic between said hot rolls, plotting the hot profile line of the space between said rolls, adding to said hot profile line the cross section of said calendered sheet in excess of that required to produce the desired cross sectional profile line of the sheet to obtain a corrected hot profile line, adjusting said corrected hot profile line to the nearest load deflection curve to form an adjusted hot profile line, allowing said calender rolls to cool to room temperature and plotting the cold profile line of the space between said rolls showing the change in profile of the space between the rolls due to cooling, subtracting the area between the hot and cold profile lines from said adjusted hot profile line to produce a cold grinding profile line, and grinding at least one of said calender rolls until the profile therebetween corresponds to said grinding profile.

5. The method of grinding at least one roll of a pair of calender rolls to produce a desired profile of the space between said rolls, comprising the steps of spacing said rolls so that the thin end of a tapered gauge may be wedged between said rolls at points along their bite line, arranging the profile line of the desired space between said rolls so that its base line is parallel to the bite line and said desired profile line will fall between said bite line and an indicator mark on said tapered gauge when it is wedged between said rolls at all points along said bite line, and grinding at least one of said rolls until said indicator mark on said gauge falls on said profile line of the desired space between said rolls when said gauge is wedged between said rolls.

6. The method of making a graph representative of the profile of the metal to be removed from one of a pair of calender rolls to produce the desired profile between said rolls, comprising the steps of making a graph of the actual profile between said calender rolls as represented by an area formed by a straight line corresponding to the line of closest proximity of said rolls and a curve plotted on one side of and at a distance from said line equal to the variable distances between said surfaces along the line of closest proximity, maintaining the base line of a curve of the desired profile between said rolls parallel to the base line of the actual profile line, and bringing said curves into contact with each other without intersecting, thereby indicating the amount of metal to be removed by the area between the two profile curves.

7. The method of making a magnified graph representative of the profile of the metal to be removed from a pair of calender rolls comprising the steps of making a graph of the desired profile between said calender rolls as represented by the area included between a straight base line corresponding to the bite line of said rolls and the desired profile line of any variations in the distances between said rolls along said bite line plotted on one side thereof, making a graph of the existing profile between said rolls as represented by the area included between a straight base line corresponding to the bite line of said rolls and a line plotted on one side of said base line at a distance from said base line equal to the variations in the distances between said rolls along said bite line, arranging said areas of said desired and existing profiles so that said base lines are parallel and said desired profile line lies within the area of said plotted existing profile and makes contact with but without intersecting said plotted existing profile lines, thereby indicating the amount of metal to be removed by the area between said desired and existing profile lines when so arranged.

PAUL W. GEYER.

References Cited in the file of this patent

UNITED STATES PATENTS

| Number | Name | Date |
|---|---|---|
| 527,581 | Benson | Oct. 16, 1894 |
| 1,390,540 | Pichler | Sept. 13, 1921 |
| 1,419,073 | Norton | June 6, 1922 |
| 1,449,318 | Fish | Mar. 20, 1923 |
| 1,465,538 | Wichstrom et al. | Aug. 21, 1923 |
| 2,295,447 | Bierman | Sept. 8, 1942 |

FOREIGN PATENTS

| Number | Country | Date |
|---|---|---|
| 560,766 | Germany | Oct. 6, 1932 |
| 596,238 | Great Britain | Dec. 31, 1947 |